US006792641B1

(12) United States Patent
Laker

(10) Patent No.: US 6,792,641 B1
(45) Date of Patent: Sep. 21, 2004

(54) PIPELINE PIG

(75) Inventor: Keith Laker, Guernsey (GB)

(73) Assignee: Hamdeen Incorporated Limited (GB)

( * ) Notice: Subject to any disclaimer, the term of this patent is extended or adjusted under 35 U.S.C. 154(b) by 0 days.

(21) Appl. No.: 09/600,902

(22) PCT Filed: Nov. 24, 1999

(86) PCT No.: PCT/GB99/03907

§ 371 (c)(1),
(2), (4) Date: Jul. 24, 2001

(87) PCT Pub. No.: WO00/30773

PCT Pub. Date: Jun. 2, 2000

(30) Foreign Application Priority Data

Nov. 24, 1998 (GB) ............................................ 9825714

(51) Int. Cl.[7] ............................ B08B 9/04; F16L 55/00; F23J 3/00

(52) U.S. Cl. .............................. 15/104.061; 15/104.15; 15/104.068; 118/105

(58) Field of Search ......................... 15/104.61, 104.05, 15/104.09, 104.12, 104.13, 104.15; 118/105

(56) References Cited

U.S. PATENT DOCUMENTS 3,480,984 A * 12/1969 Kidd ....................... 15/104.06
3,619,844 A * 11/1971 Collins et al. ......... 15/104.061
3,939,519 A * 2/1976 Muirhead .............. 15/104.061
4,081,875 A 4/1978 Nishino ................... 15/104.06
4,122,575 A 10/1978 Sagawa ................... 15/104.06
4,603,449 A * 8/1986 Knapp ................... 15/104.061
5,068,142 A * 11/1991 Nose et al. .................... 442/50
5,244,505 A * 9/1993 Allison et al. ........... 134/22.11
5,379,475 A 1/1995 Sivacoe ................. 15/104.061
5,600,863 A 2/1997 Curran
5,657,820 A 8/1997 Bailey et al. .............. 166/55.7
5,797,993 A * 8/1998 Woehleke ...................... 134/8
5,819,353 A 10/1998 Armell et al. ............. 15/104.2
5,964,004 A * 10/1999 Bean ....................... 15/104.05

FOREIGN PATENT DOCUMENTS

DE 29 44 709 A1 5/1981

OTHER PUBLICATIONS

Excerpt from the website http://www.dupont.com/kevlar/whatiskevlar.html.

* cited by examiner

*Primary Examiner*—Robert J. Warden, Sr.
*Assistant Examiner*—Laura C Cole
(74) *Attorney, Agent, or Firm*—Fleshner & Kim, LLP

(57) ABSTRACT

A pig for use with a tubular bore wherein the pig is comprised of a body which supports a plurality of turbine blades wherein the blades mechanically break down and remove debris from the tubular bore. The blades have a profile which allows forward movement and rotation about a longitudinal axis when acted upon by a propulsion fluid traveling through the tubular. In an alternative embodiment the blades are mounted on a stabilizer body to allow simultaneous centralization and cleaning.

14 Claims, 1 Drawing Sheet

PIPELINE PIG

BACKGROUND OF THE INVENTION

1. Field of the Invention

This invention generally relates to mechanical pigging devices, commonly referred to simply as “pigs”, for use in pipelines or other tubulars. Such pigs are known to find utility in a diverse range of applications, including for cleaning purposes and for conveying equipment in the case, for example, of pipeline monitoring. In the present invention there is described a unique pig suitable for use in the cleaning of internal surfaces of a pipeline or tubular and, in a variation thereof, suitable for applying coatings or other fluids to the aforesaid surfaces.

2. Background of Related Art

It is known in the art to cause cleaning pigs to be propelled through a pipe or tubing under the influence of a pressurised fluid. Pigs, designed for this purpose, typically have a flexible cylindrical body made, for example, from a polyurethane foam. Other materials have also commonly been used, including rubber, metal, plastics and combinations and composites. The rear and front end walls of the cylindrical body may be covered with an impervious coating designed to form a moving seal with the inner wall of the pipe. With this design, the pig essentially acts as a piston as it is conveyed through the pipeline or tubular; the fluid on its rear side having a higher pressure head than the fluid at its front side.

Notably, pigs propelled through pipelines or the like in the manner described above are intended to prevent propelling fluid from flowing through or around the pig. Implicated by this, pigs used for cleaning purposes have, in the past, been intended to physically push and forceout debris in advance of the pig as it travels through the pipe bore. At best, the pig itself provides an additional wiping function on the pipe walls.

In the present invention it is recognised that, on occasion, it would be advantageous to provide a more rigorous cleaning process to a pipeline bore than merely pushing loose debris and wiping the surfaces. In the art, those who have addressed this problem have contemplated the provision of scratching elements, such as wire bristles, on the circumferential walls of the pig. While related designs provide for a more aggressive cleaning process, such pigs usually do not allow for sufficient fluid flow past the bristles to allow for the bristles themselves to be cleaned. In use, debris, shavings, slivers and the like can become lodged between the bristles, serving to reduce the efficiency of the pig’s travel and the cleaning process.

SUMMARY OF THE INVENTION

An object of the present invention is to obviate or at least mitigate these and other disadvantages associated with pipeline or tubular cleaning pigs. In one aspect, the invention seeks to achieve this by creating an alternative means for the propulsion of the pig through the pipeline or other tubular.

A further object of the invention herein is to employ the novel propulsion features disclosed herein in relation to pigs for use in respect of other functions, including pigs intended to act as mechanical applicators,

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
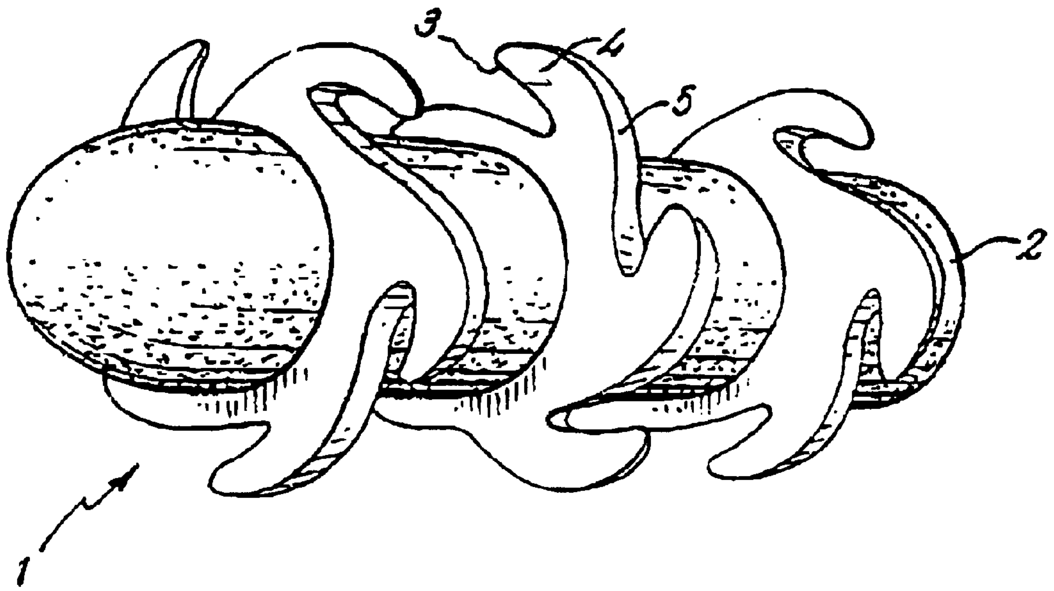
FIG. 1 shows, in perspective view, a pig intended for the cleaning of the internal surfaces of coiled tubing as the pig is propelled along the tubular by a propulsion fluid.

According to a first aspect of the present Invention there is provided a pig for use in a tubular bore, wherein the pig is provided with one or more blades having a profile that encourages both forward movement and rotation about a longitudinal axis of the pig when acted upon by a propulsion fluid travelling through the tubular.

It is envisaged that the pig may comprise of a cylindrical elongate body having an outer diameter less than the internal diameter of the tubular, wherein the body supports a plurality of blades.

Preferably, the pig is a cleaning pig and the peripheral edges of the blades are adapted to perform a cleaning function as the pig rotates and travels through the tubular. More particularly, the blades of the pig are designed to scrape the internal surfaces of the tubular bore upon the rotation and passage of the pig. An advantage may be obtained in the option of providing the edges in an abrasive material. Similarly, the edges of the blades may be provided in a material that is relatively hard and therefore resistant to wear.

Alternatively, however, the peripheral edges may be adapted to perform alternative functions. For example, the pig may be provided as a means for the mechanical application of a coating or fluid to a tubular bore and, optionally, the blades or at least the edges thereof may support a suitable applicator material having a high capacity for carrying by absorption or other means the coating or fluid to be applied.

According to a second aspect of the present invention there is provided a pig for use in a tubular, wherein the pig is comprised of a stabilizer body wherein the stabilizer body supports a plurality of blades and is conveyed mechanically through a tubular.

Preferably the pig is a cleaning pig wherein the blades of the pig are designed to scrape the internal surfaces of the tubular bore whilst the stabiliser body provides centralisation.

Preferably the blades may be adapted so that they do not exhibit any abrasive qualities thereby reducing the risk of damage if the pig is to be used in tubing which is plastic coated.

Preferably the blade properties can be pre selected to be adapted to flex through a profiled restriction in the tubular bore thereby providing a means of confirming the position of a pig within the tubulars.

According to a third aspect of the present invention there is provided a pig for use in a tubular, wherein the pig is adapted to rotate in its longitudinal axis under the influence of a propulsion fluid as it is displaced through the tubular.

The pig may be further adapted to rotate in orbit within the tubular bore.

According to a fourth aspect of the present invention there is provided a pig for use in a tubular, the pig comprising reaction surfaces adapted for forward propulsion of the pig under the influence of a positive pressure applied by propulsion fluid travelling through the tubular, characterised in that the reaction surfaces are spaced and orientated so as to provide for a net positive velocity of the propulsion fluid relative to the pig in the direction of travel through the tubular.

The reaction surfaces may be provided on a plurality of respective blades, such as turbine blades. Preferably, the blades define a fluid by-pass path, the blades being separated by void areas which permit the relative flow of fluid through the pig in a forward direction.

Preferably the reaction surfaces also encourage the rotation of the pig around its longitudinal axis when acted upon by the propulsion fluid.

According to a fifth aspect of the present invention there is provided a pig for use in a tubular, wherein the pig is provided with one or more blades having a profile that precludes rotation of the pig while travelling through the tubular.

The blades are typically of varying diameter, the largest blade or blades potentially, having a diameter greater than the internal diameter of the tubular, Preferably the largest blade or blades are sufficiently flexible to allow entry and passage of the pig through the tubular yet sufficiently robust to carry out and withstand the rigours of the cleaning process.

It should be understood that references to tubulars herein, unless the context otherwise dictates, should be construed in the broadest possible sense, and interpreted to encompass any form of tubing, pipe or pipeline.

In order to provide a better understanding of the invention, example embodiments of a pig incorporating the invention will now be described with reference to the accompanying Figures.;

Referring firstly to FIG. 1, a pig, generally depicted at 1, comprises substantially of a body 2 and a plurality of turbine blades 3. The body 2 is generally elongate and cylindrical. The pig body 2 is suitably made of a robust material in view of its need to withstand substantial impact loads, while also functioning in an aggressive cleaning manner.

The blades 3 are afforded a turbine or impeller like profile, having reaction surfaces 4 that react to the influence of a propulsion fluid pumped through the coiled tubing in which the pig 1 is intended to travel. Typical of turbine blades, the blades 3 can be provided on the body 2 such that the reaction surfaces 4 are presented at an acute angle to the linear direction of the fluid flow, thereby imparting a reaction torque to the body 2 in addition to a reaction force in the axial direction. In consequence, the pig 1, when acted upon by a propulsion fluid, is caused to travel through the coiled tubing in a generally axial direction, but to also rotate about its longitudinal axis while so doing.

Additionally, the pig 1 moves in a third dynamic path. The outside diameter of the pig 1 can be sized to have a degree of clearance within the internal bore of the tubular. That is to say, the maximum outside diameter of the pig is less than the internal diameter of the tubular, allowing for radial displacement of the pig 1 during its travel through the tubing. In fact, it is recognised in the present invention, that such dimensioning of the pig 1 relative to the tubing causes the longitudinal axis of the pig 1 to orbit or rotate about the substantially parallel longitudinal axis of the tubing.

This third dynamic path is associated with a number of advantages For instance, where it is intended that the peripheral edges 5 of the blades 3 contact the internal surfaces of the tubing, the radial displacement of the pig 1 as it orbits around the longitudinal axis of the tubing allows for such contact over a range of tubing diameters. This means that it is not essential that a respective pig, incorporating the invention hereto, need be provided to correspond to each size of coiled tubing or other tubular.

In an alternative application a pipeline can be cleaned using a combination of two pigs. The first pig, having an outer diameter less than the internal diameter of the tubular, passes through the pipeline removing major restrictions. The second pig removes additional debris and in effect polishes the internal surface of the pipeline.

A further advantage, which applies also to the other rotational movement of the pig about its own axis, is that the relative velocity of the blade edges 5 is considerably higher relative to the tubing surfaces than that of a pig merely designed for linear movement. This is particularly advantageous where the pig is intended for use as a mechanical cleaning device.

The cleaning pig 1 is designed to clean the internal bore of coiled tubing. More particularly, the pig 1 is adapted to apply a rotational cleaning action suitable for removing scales and other deposits located on the internal surfaces of the tubing.

In one use, the pig may be used to prepare the surface of a tubular, by removing scale or rust not removed by other cleaning methods, prior to the application of a coating fluid or material.

Secondary cleaning of the coiled tubing is achieved by the effects of disturbances in the flow of the propulsion fluid through the voids between the turbine blades 3.

The interaction of the turbine blades with the propulsion renders the propulsion fluid flow of a turbulent nature. It will be appreciated by those skilled in the art that this enhances the cleaning efficiency of the device.

Furthermore, the presence of voids between the blades 3 results in the propulsion fluid having a positive velocity relative to the pig. As a consequence of this positive velocity the propulsion fluid also removes the debris created by the cleaning of the coiled tubing. The removal of this debris has the advantage of preventing the build up of potential blockages in the coiled tubing. Moreover, debris is also cleaned from the blades of the pig itself:

In an alternative embodiment the reaction surfaces 4 and most particularly peripheral edges 5 of the blades 3 are provided with a material suitable for the application of a coating of other fluid material.

Figure 2:
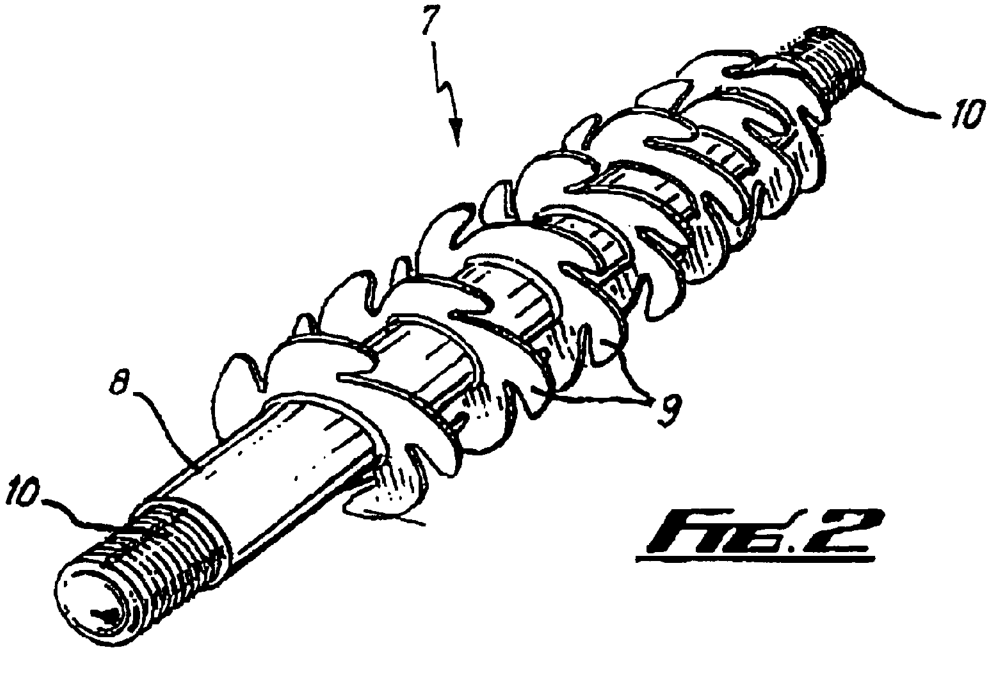
FIG. 2 shows, in perspective view, a pig intended to provide stabilization and cleaning of the internal surfaces of tubing as the pig is conveyed mechanically along a tubular.

With reference to FIG. 2, an alternative embodiment of the present invention generally depicted at 7 comprises a stabiliser body 8 which has a plurality of blades 9 mounted in a similar configuration to the embodiment shown in FIG. 1. The stabiliser body 8 has coupling means 10 which allow attachment to mechanical driving means (not shown) so that the stabiliser body 8 is propelled through a tubular. Where the tubular is casing or liner in a well-bore, the mechanical driving means may be a pipe string, for example. Furthermore the blades 9 are mounted on the stabiliser body 8 in a watermelon shaped configuration which assists entry into and retrieval out of profiled restrictions.

In this manner the embodiment shown in FIG. 2 allows simultaneous centralisation and cleaning for coiled tubing.

Further modifications and improvements may be incorporated without departing from the scope of the invention herein intended.

It is claimed:

1. A pig for use in a tubular bore, comprising:

a cylindrical elongate body;

one or more blades mounted on the body, wherein each blade comprises one or more reaction surfaces, and wherein each surface comprises a peripheral edge configured to perform a rotational cleaning action for removing scale and other deposits located on an internal surface of the tubular bore, and each blade further comprises at least one fluid by-pass path through the blade to permit a flow of fluid to pass the pig, wherein each blade is manufactured from a composite comprising para-aramid fiber produced from poly-paraphenylene terephthalamide and further wherein each blade is also configured to cause the longitudinal axis of the pig to orbit about a substantially parallel axis of the tubular bore when a pressurized fluid pushes the pig through the tubular bore.

2. A pig as claimed in claim 1, wherein the composite further includes carbon.

3. A pig as claimed in claim 1, wherein the composite further includes glass fiber.

4. A pig as claimed in claim 1, wherein there are a plurality of blades and each pair of adjacent blades define a void therebetween.

5. A pig as claimed in claim 1, wherein the body includes means for connection to mechanical driving means, and wherein each blade comprises a fixed diameter, and wherein a combination of all blades has a watermelon shaped profile.

6. A method of cleaning a tubular bore, comprising:

selecting a pig according to claim 1, wherein the pig comprises a maximum outside diameter less than an internal diameter of the tubular bore;

inserting the pig into the tubular bore; and providing pressurized fluid to the tubular bore, whereupon the pressurized fluid applies a force to the reaction surfaces of each blade which urges the pig to travel through the tubular in a generally axial direction, rotate about its longitudinal axis, and further urges a longitudinal axis of the pig to orbit about a substantially parallel longitudinal axis of the tubular bore.

7. The pig of claim 1, comprising multiple blades rigidly mounted on the body, wherein each blade is fixed relative to one another.

8. The pig of claim 1, comprising multiple blades rigidly mounted on the body, wherein each blade comprises a mounting aperture having the body disposed therethrough.

9. The pig of claim 8, wherein a rim of each respective mounting aperture is rigidly attached to the body.

10. The pig of claim 8, wherein a peripheral edge of each blade comprises at least one contact region configured to contact an interior surface of the tubular bore.

11. The pig of claim 10, wherein each fluid by-pass path comprises a by-pass aperture positioned in a respective blade substantially between the mounting aperture and the contact region.

12. A pig for use in a tubular bore, comprising:

a cylindrical elongate body; and a plurality of blades rigidly mounted on the body, wherein each blade comprises a peripheral edge configured to contact an inner surface of the tubular bore and to perform a rotational cleaning action on the inner surface of the tubular bore, and wherein each blade is configured to cause the pig to rotate about its longitudinal axis when a pressurized fluid pushes the pig through a tubular bore and further wherein each blade is also configured to cause the longitudinal axis of the pig to orbit about a substantially parallel axis of the tubular bore when a pressurized fluid pushes the pig through the tubular bore.

13. The pig of claim 12, wherein each blade comprises at least one fluid by-pass path that allows a flow of fluid to pass though the blade.

14. The pig of claim 13, wherein the at least one fluid by-pass path in each blade is configured to allow debris removed from an inner surface of a tubular bore to pass the blade.

* * * * *